United States Patent [19]

Camberlin et al.

[11] Patent Number: 5,122,590
[45] Date of Patent: Jun. 16, 1992

[54] IMIDO/HINDERED DIAMINE COPOLYMERS

[75] Inventors: Yves Camberlin, Caluire; Rene Arpin, Lyons, both of France

[73] Assignee: Rhone-Poulenc Chimie, Courbevoie, France

[21] Appl. No.: 506,744

[22] Filed: Apr. 10, 1990

[30] Foreign Application Priority Data

Apr. 10, 1989 [FR] France .................. 8904935

[51] Int. Cl.⁵ ............... C08G 73/10; C08G 73/00; C08G 59/00
[52] U.S. Cl. ................. 528/322; 528/96; 528/170
[58] Field of Search ............ 528/96, 170, 322

[56] References Cited

U.S. PATENT DOCUMENTS

| | | | |
|---|---|---|---|
| 4,883,858 | 11/1989 | Takemoto et al. | 528/170 |
| 4,886,868 | 12/1989 | Kakoutz | 528/170 |
| 4,959,443 | 9/1990 | Yamaya et al. | 528/170 |

FOREIGN PATENT DOCUMENTS

| | | |
|---|---|---|
| 0059434 | 9/1982 | European Pat. Off. . |
| 0274968 | 6/1988 | European Pat. Off. . |
| 2609467 | 8/1988 | France . |

*Primary Examiner*—John Kight, III
*Assistant Examiner*—Terressa M. Mosley
*Attorney, Agent, or Firm*—Burns, Doane, Swecker & Mathis

[57] ABSTRACT

Novel heat-stable imido polymers, well adapted for the production of prepregs, are prepared by copolymerizing (a) at least one N,N'-bisimide with (b) at least one hindered aromatic diprimary diamine, (c) optionally, at least one unhalogenated comonomer other than a bisimide, (d) optionally, an imidazole compound, (e) at least one diamino-s-triazine, and (f) at least one chlorinated or brominated epoxy resin (f1), or N,N'-alkylenebistetrahalophthalimide (f2), or halogenated aromatic compound containing two (meth)-allyloxylated benzene nuclei (f3), or unhalogenated epoxy resin (f4).

14 Claims, No Drawings

IMIDO/HINDERED DIAMINE COPOLYMERS

BACKGROUND OF THE INVENTION

1. Field of the Invention

The present invention relates to novel imido polymers, and, more especially, to novel imido copolymers comprising hindered diamine recurring units which have good mechanical and electrical properties and which are particularly heat-stable at elevated temperatures.

2. Description of the Prior Art

French Patent Application FR-A-2,608,613 describes imido polymers, including heat-curable prepolymers, which comprise the product of reaction, at a temperature ranging from 50° C. to 300° C., between:

(a) an N,N'-bisimide or a plurality of bisimides of the formula:

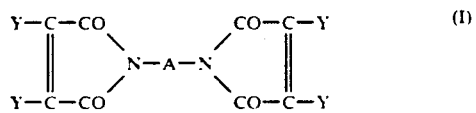

in which each of the symbols Y, which may be identical or different, is H, $CH_3$ or Cl; and the symbol A is a divalent radical selected from among the following: cyclohexylene, phenylenes, 4-methyl-1,3-phenylene, 2-methyl-1,3-phenylene, 5-methyl-1,3-phenylene and 2,5-diethyl-3-methyl-1,4-phenylene, and the radicals of the formula:

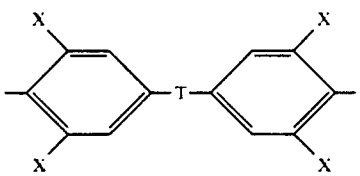

wherein T is a single valence bond or one of the groups:

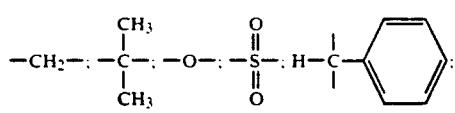

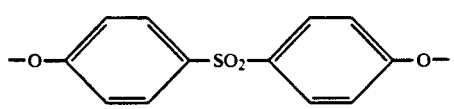

and each of the symbols X, which may be identical or different, is a hydrogen atom or a methyl, ethyl or isopropyl radical;

(b) one or more hindered diprimary diamine(s) selected from among:

(i) the species corresponding to the general formula:

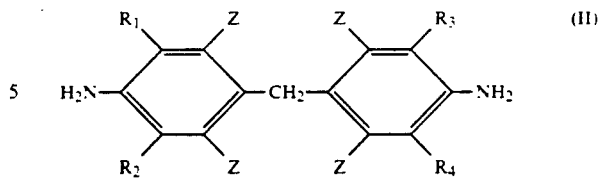

in which each of the symbols $R_1$, $R_2$, $R_3$ and $R_4$, which may be identical or different, is a methyl, ethyl, propyl or isopropyl radical; and each of the symbols Z, which also may be identical or different, is a hydrogen atom or a chlorine atom; and (ii) the species corresponding to the general formula:

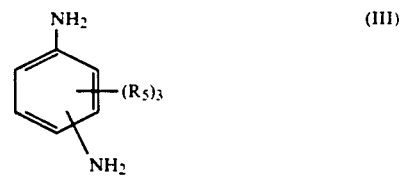

in which the amino radicals are in a meta or para position relative to each other; and each of the symbols $R_5$, which may be identical or different, is a methyl, ethyl, propyl or isopropyl radical;

(c) optionally, one or more unhalogenated monomer(s) other than a bisimide of formula (I) and comprising one or more polymerizable carbon-carbon double bond(s); and (d) optionally, an imidazole compound.

One advantage of such imido polymers is provided by the steric hindrance of the amine reactant (b), which is responsible for a lower reactivity of the constituents of the polymerization mixture when compared with the polyaminobismaleimides prepared from unhindered diamines. This lower reactivity of the constituents of the polymerization mixture is of special interest not only for the production of articles requiring a prepolymer in the molten state, but also for the production of articles requiring a prepolymer in the form of solution in a solvent. Indeed, the viscosity of the prepolymer in the molten state, or that of the solution of the prepolymer, changes more slightly and this greatly facilitates the processing of the prepolymer, especially in applications requiring a working life of a number of hours.

A second advantage of the imido polymers described in the '613 published French application is that such polymers are prepared without requiring special precautions from the standpoint of health and safety, given that the hindered diamines (b) employed do not present the toxicity hazards which are generally associated with unhindered aromatic diprimary amines.

SUMMARY OF THE INVENTION

A major object of the present invention is the provision of yet further improved imido polymers vis-a-vis those described in said '613 French application, said further improved imido polymers differing from the prior art by additionally comprising the following two added constituents:

(1) at least one heterocyclic diprimary diamine selected from among the guanamines (or diamino-s-triazines); this constituent enables increasing the reactivity of the constituents (a), (b) and optionally (c) of the polymerization mixture and, in the case of the molded or shaped objects ultimately obtained, results in the provision of properties having high values without having to carry out, after the prepolymer has been cured, a postcure (or after-bake) stage at a high temperature for a period of time ranging from about 10 hours to several tens of hours, depending on the temperature which is adopted (it has also been unexpectedly found that such high property values are quite close to, and can even be as good as, the optimum values attained for these properties when the operation is carried out according to the prior art, i.e., in the absence of guanamine and indeed conducting a postcure stage); and (2) a compound selected from among: a chlorinated or brominated epoxy resin); an N,N'-alkylenebistetrahalophthalimide; a product containing two phenyl radicals bonded directly via a single valence bond, a divalent radical or a bridging atom, in which each phenyl radical is substituted by a (meth)allyloxy radical and by at least two chlorine or bromine atoms; and unhalogenated epoxy resin; or admixture of two or more than two of the above compounds; this constituent enables providing a low coefficient of thermal expansion for the final polymers, as well as an excellent resistance to combustion, in the case where a halogenated compound is employed.

Another object of the present invention is the provision of improved imido polymers comprising the hindered diprimary diamines of the type of those of formula (II) containing two hindered 4-aminophenyl radicals, but which are bonded together by a divalent group other than —CH$_2$—.

Briefly, the present invention features novel imido polymers which comprise the copolymerizates, at a temperature ranging from 50° C. to 300° C., of:

(a) at least one N,N'-bisimide having the formula (I) and corresponding definitions given above;

(b) at least one hindered aromatic diprimary diamine;

(c) optionally, at least one unhalogenated comonomer other than a bisimide of formula (I) and containing one or more polymerizable carbon-carbon double bonds; and (d) optionally, an imidazole compound;

with the proviso that said at least one hindered aromatic diprimary diamine (b) comprises:

(1) a compound having the general formula:

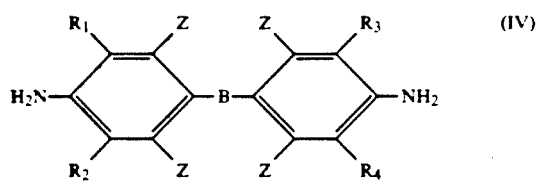

in which each of the symbols R$_1$, R$_2$, R$_3$ and R$_4$, which may be identical or different, is a methyl, ethyl, propyl or isopropyl radical; each of the symbols Z, which may be identical or different, is a hydrogen atom or a chlorine atom; and the symbol B is a divalent radical selected from among: —CH$_2$—;

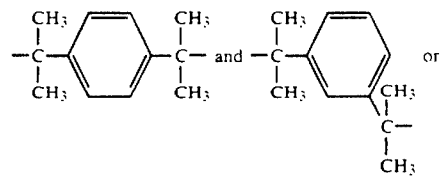

(ii) a compound having the general formula:

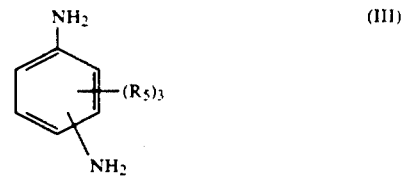

in which the amino radicals are in a meta or para position relative to each other; and each of the symbols R$_5$, which may be identical or different, is a methyl, ethyl, propyl or isopropyl radical;

and with the added proviso that said copolymerizates further comprise:

(e) at least one substituted guanamine of the formula:

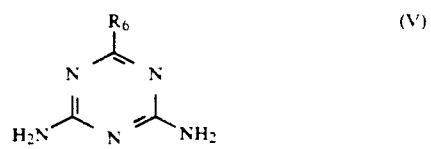

in which the symbol R$_6$ is a linear or branched chain alkyl radical having from 1 to 12 carbon atoms such as, for example, a methyl, ethyl, propyl, butyl, pentyl, hexyl, heptyl, octyl, nonyl, decyl, undecyl or dodecyl radical, an alkoxy radical having from 1 to 12 carbon atoms, a phenyl radical optionally substituted by 1 to 3 alkyl radicals having from 1 to 3 carbon atoms, a phenylalkyl radical having from 1 to 3 carbon atoms in the alkyl moiety and the benzene nucleus of which may optionally be substituted by 1 to 3 alkyl radicals having from 1 to 3 carbon atoms; and (f) at least one compound selected from among;

(f1) a chlorinated or brominated epoxy resin;

(f2) an N,N'-alkylenebistetrahalophthalimide of the formula:

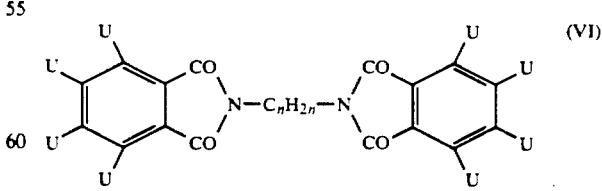

in which each of the symbols U, which may be identical or different, is a chlorine or bromine atom; the alkylene radical —C$_n$H$_{2n}$— may be linear or branched; and n is an integer equal to 1, 2, 3 or 4;

(f3) a halogenated compound of the formula:

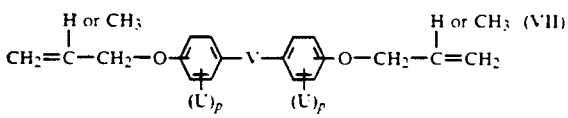

in which the symbols U are as defined above; the symbol V is a single valence bond, a linear or branched chain alkylene radical —$C_nH_{2n}$—, with n being equal to 1, 2, 3 or 4, or an oxygen atom; and p is an integer equal to 2, 3 or 4;

(f4) an unhalogenated epoxy resin; and (f5) a mixture of two or more of the above-mentioned compounds (f1) to (f4).

DETAILED DESCRIPTION OF THE PREFERRED EMBODIMENTS OF THE INVENTION

More particularly according to the present invention, exemplary of the above guanamines (e), the following are especially representative:

2,4-Diamino-6-methyl-1,3,5-triazine;
2,4-Diamino-6-ethyl-1,3,5-triazine;
2,4-Diamino-6-butyl-1,3,5-triazine;
2,4-Diamino-6-nonyl-1,3,5-triazine;
2,4-Diamino-6-undecyl-1,3,5-triazine;
2,4-Diamino-6-methoxy-1,3,5-triazine;
2,4-Diamino-6-butoxy-1,3,5-triazine;
2,4-Diamino-6-phenyl-1,3,5-triazine;
2,4-Diamino-6-benzyl-1,3,5-triazine; and
2,4-Diamino-6-(4-methyl)phenyl-1,3,5-triazine.

These guanamines are known compounds, certain of which are available commercially. The preferred guanamines are 2,4-diamino-6-methyl-1,3,5-triazine, 2,4-diamino-6-nonyl-1,3,5-triazine, 2,4-diamino-6-phenyl-1,3,5-triazine and mixtures thereof.

The amount of the additive (e) generally represents 2% to 30%, and preferably 4% to 15%, of the weight of the mixture of bisimide(s) (a)+diamine(s) (b)+additive (f)+optionally reactant (c).

By "chlorinated or brominated epoxy resin (f1)" is intended an epoxy resin which has an epoxy equivalent weight ranging from 200 to 2,000 and which comprises a glycidyl ether prepared by reacting epichlorohydrin with an aromatic derivative which is chlorinated or brominated on the aromatic nucleus (or nuclei) and produced from a polyphenol selected from among: the bis(hydroxyphenyl)alkanes such as 2,2-bis(4-hydroxyphenyl)propane, bis(4-hydroxyphenyl)methane, bis(4-hydroxyphenyl)methylphenylmethane or bis(4-hydroxyphenyl)tolylmethanes, resorcinol, hydroquinone, pyrocatechol, 4,4'-dihydroxydiphenyl, and the products of condensation of the abovementioned phenols with an aldehyde.

By the expression "epoxy equivalent weight" is intended the weight of resin (in grams) containing one epoxy functional group

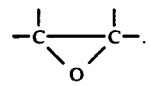

A chlorinated or brominated epoxy resin which has an epoxy equivalent weight ranging from 250 to 500 is preferred. An epoxy resin (f1) comprising a resin derived from the glycidyl ethers of bis(hydroxyphenyl)alkanes brominated on the aromatic nuclei, which were discussed above in connection with the detailed definition of the resin (f1), is especially preferred according to the present invention.

With regard to the compound (f2) of formula (VI), an N,N'-alkylenebistetrabromophthalimide is the preferred. N,N'-Ethylenebistetrabromophthalimide is especially preferred according to the present invention.

With regard to the compound (f3) of formula (VII), preferred is a bis(allyloxydibromophenyl)alkane of the formula:

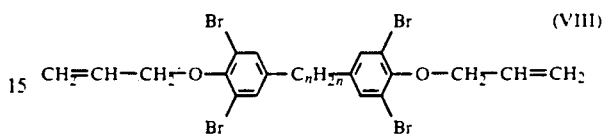

in which n is an integer equal to 1, 2 or 3. 2,2-Bis(4-allyloxy-3,5-dibromophenyl)propane is especially preferred according to the present invention.

By "unhalogenated epoxy resin (f4)" is intended an epoxy resin which has an epoxy equivalent weight ranging from 100 to 1,000 and which comprises a glycidyl ether prepared by reacting epichlorohydrin with a polyphenol which is unchlorinated and unbrominated on the aromatic nucleus (or nuclei) and selected from among the phenols discussed above in connection with the definition of the resin (f1).

An unhalogenated epoxy resin which has an epoxy equivalent weight ranging from 150 to 300 is preferred. An epoxy resin (f4) comprising a resin including the glycidyl ethers of bis(hydroxyphenyl)alkanes which are not halogenated on the aromatic nuclei and which were discussed above in connection with the detailed definition of the resin (f1), is especially preferred.

With regard to the mixtures (f5), preferred is a mixture of two or more of the preferred compounds (f1) to (f4) which were referred to above.

The amount of the additive (f) generally represents 2% to 30%, and preferably 3% to 15%, of the weight of the mixture of bisimide(s) (a)+diamine(s) (b)+optionally reactant (c).

It has been established that the amount of chlorine or of bromine which may be introduced into the polymers according to the invention by the additive (f) is such as to affect certain properties of the cured polymers obtained, especially the properties relating to heat stability and the adhesiveness of the polymers to metals such as, for example, copper. In this respect, the best results are obtained when this amount of chlorine or of bromine introduced by the additive (f), expressed as the percentage by weight of elemental chlorine or of elemental bromine in relation to the weight of the overall mixture of bisimide(s) (a)+diamine(s) (b)+optional reactant (c)+additives (e) and (f), represents not more than 8%; this amount of chlorine or of bromine preferably ranges from 1 to 6%. The amount of chlorine or of bromine can be easily adjusted to the desired value by using, for example, epoxy resins (f1) which have a higher or lower chlorine or bromine content or by starting with mixtures of chlorinated or brominated epoxy resins (f1) with unhalogenated epoxy resins (f4), or else by starting with mixtures of compounds (f2) and/or (f3) with unhalogenated epoxy resins (f4).

By way of specific examples of bisimides (a) of formula (I), particularly representative are the compounds indicated in French Application FR-A-2.608.613. namely:

N,N'-Meta-phenylenebismaleimide;
N,N'-Para-phenylenebismaleimide;
N,N'-4.4'-Diphenylmethanebismaleimide;
N,N'-4.4'-Diphenyl ether bismaleimide;
N,N'-4.4'-Diphenyl sulfone bismaleimide;
N,N'-1.4-Cyclohexylenebismaleimide;
N,N'-4,4'-(1,1-Diphenylcyclohexane)bismaleimide;
N,N'-4,4'-(2,2-Diphenylpropane)bismaleimide;
N,N'-4,4'-Triphenylmethanebismaleimide;
N,N'-2-Methyl-1,3-phenylenebismaleimide;
N,N'-4-Methyl-1,3-phenylenebismaleimide; and
N,N'-5-Methyl-1,3-phenylenebismaleimide.

These bismaleimides can be prepared according to the processes described in U.S. Pat. No. 3,018,290 and British Patent GB-A-1,137,290. According to the present invention, N,N'-4,4'-diphenylmethanebismaleimide, either alone or mixed with N,N'-2-methyl-1,3-phenylenebismaleimide, N,N'-4-methyl-1,3-phenylenebismaleimide and/or N,N'-5-methyl-1,3-phenylenebismaleimide is the preferred.

Exemplary of the hindered diamines (b) of formulae (IV) and (III), particularly representative are:

4,4'-Diamino-3,3'-5,5'-tetramethyldiphenylmethane;
4,4'-Diamino-3,3',5,5'-tetraethyldiphenylmethane;
4,4'-Diamino-3,5-dimethyl-3',5'-diethyldiphenylmethane;
4,4'-Diamino-3,3'-diethyl-5,5'-dimethyldiphenylmethane;
4,4'-Diamino-3,3',5,5'-tetraisopropyldiphenylmethane;
4,4'-Diamino-3,3'-diisopropyl-5,5'-dimethyldiphenylmethane;
1,4-Bis(4-amino-3,5-dimethyl-α,α-dimethylbenzyl)benzene;
1,3-Bis(4-amino-3,5-dimethyl-α,α-dimethylbenzyl)benzene;
1,3-Diamino-2,4-diethyl-6-methylbenzene; and
1,3-Diamino-2-methyl-4,6-diethylbenzene.

These hindered diamines may be prepared according to the procedures described in British Patent GB-A-852,651 and U.S. Pat. No. 3,481,900. According to the present invention, 4,4'-diamino-3,3',5,5'-tetramethyldiphenylmethane, 4,4'-diamino-3,3',5,5'-tetraethyldiphenylmethane, 4,4'-diamino-3,3'-diethyl-5,5'-dimethyldiphenylmethane and mixtures thereof are the preferred.

The amount of N,N'-bisimide(s) (a) and of hindered diamine(s) (b) are selected such that the ratio r:

$$r = \frac{\text{number of moles of bisimide(s) } (a)}{\text{number of moles of diamine(s) } (b)}$$

generally ranges from 1.5/1 to 20/1 and, preferably, from 2/1 to 5/1.

In some cases it may be advantageous to modify the polymers according to the present invention by also incorporating a copolymerizable reactant (c) and/or an imidazole compound (d).

As an optional reactant (c) which is suitable, particularly representative are the compounds indicated in French Application FR-A-2,608,613, namely:

(c1) either one or more monomers of the formula:

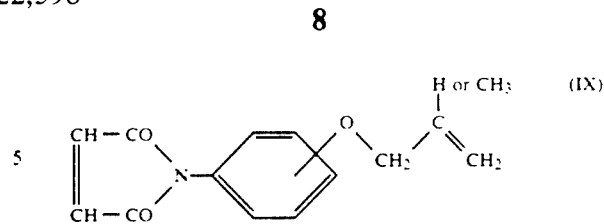

in which the allyloxy or methallyloxy radical is in an ortho, meta or para position in relation to the carbon atom of the benzene ring which is bonded to nitrogen;

(c2) a compound comprising a mixture of (i) a monomer of the formula:

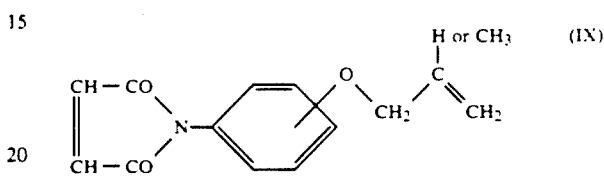

in which the allyloxy or methallyloxy radical is in an ortho, meta or para position in relation to the carbon atom of the benzene ring which is bonded to nitrogen, with: (ii) at least one monosubstituted derivative of the formula:

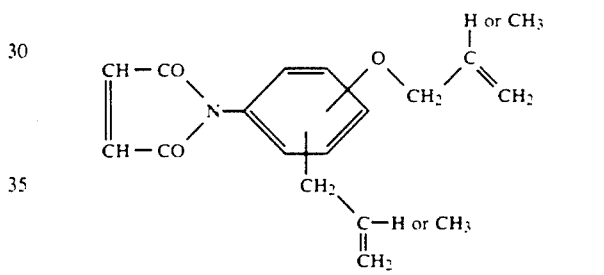

and optionally with (iii) one or more distributed derivative(s) of the formula:

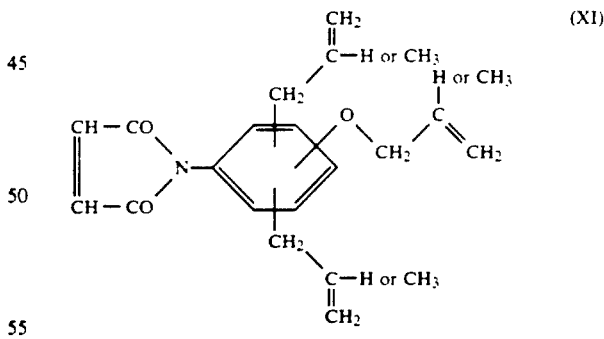

In the abovementioned compound employed as reactant (c2), the proportions of the various constituents of the mixture of the compounds of formulae (IX), (X) and optionally (XI) may vary over wide limits. In general, the proportions of the constituents are selected within the following limits (expressing the weight percentage of each of the constituents in the mixture): at least 30%, and preferably from 50% to 80% of N-(meth)allyloxyphenylmaleimide of formula (IX); from 5% to 50% and preferably from 10% to 35% of mono-(meth)allyl-substituted derivative(s) of formula (X); and from 0% to 20% and preferably from 0% to 15% of di-(meth)allyl-substituted derivative(s) of formula (XI), with the sum of the constituents in each case having to be equal to 100% by weight; or (c3) one or more substituted heterocyclic ring(s).

It should be appreciated that mixtures (cl +c3) or (c2+c3) may be employed as reactant (c).

With regard to the optional reactant (cl), this advantageously comprises:

N-(2-Allyloxyphenyl)maleimide;
N-(3-Allyloxyphenyl)maleimide;
N-(4-Allyloxyphenyl)maleimide;
N-(2-Methallyloxyphenyl)maleimide;
N-(3-Methallyloxyphenyl)maleimide;
N-(4-Methallyloxyphenyl)maleimide; and mixtures thereof.

The maleimides of formula (IX) are known compounds which are described in European Patent Application EP-A-0,208,634.

With regard to the optional reactant (c2), the crude product produced by the process described in European Patent Application EP-A-0,274,967 is preferably employed as the compound containing a mixture of N-(meth)allyloxyphenylmaleimide of formula (IX) with one or more (meth)allylated substitution derivative(s) of formula(e) (X) and optionally (XI).

With regard to the optional reactant (c3), this is advantageously selected from among: vinylpyridines, N-vinylpyrrolidone, allyl isocyanurate, vinyltetrahydrofuran and mixtures thereof.

With regard to the amount of optional reactant (c), this generally represents less than 60%, and preferably from 2% to 25%, of the total weight of the reactants (a) and (b).

The optional imidazole compound (d) advantageously has the general formula indicated in French Application FR-A-2,608,613, namely:

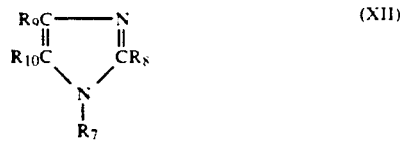

in which each of $R_7$, $R_8$, $R_9$ and $R_{10}$, which may be identical or different, is a hydrogen atom, an alkyl or alkoxy radical having from 1 to 20 carbon atoms, or a vinyl, phenyl or nitro radical, with the proviso that $R_9$ and $R_{10}$ may together form, with the carbon atoms from which they depend, a single ring member such as, for example, a benzene ring, and with the further proviso that $R_7$ may comprise a carbonyl group bonded to a second imidazole ring.

As specific examples of imidazole compounds (d), particularly representative are imidazole or glyoxaline, 1-methylimidazole, 2-methylimidazole, 1,2-dimethylimidazole, 1-vinylimidazole, 1-vinyl-2-methylimidazole, benzimidazole and carbonyldiimidazole.

The optional imidazole compound (d) is employed in catalytic amounts. Depending on the nature of the imidazole compound and depending on the desired rate of polymerization at the processing stage, the imidazole compound is advantageously employed in a proportion which generally ranges from 0.005% to 1% by weight relative to the combination of reactants (a)+(b)+optionally (c) and preferably ranges from 0.01% to 0.5%.

It should be appreciated that the proportions of the constituents of the polymerization recipe in accordance with the present invention which are generally employed are selected within the ranges indicated above such as to provide a total number of carbon-carbon double bonds [introduced by (a)+optionally (c)+optionally (f3)]and, if appropriate, of epoxy groups [introduced by (f1) or (f4)] greater than the total number of amino groups [introduced by (b) +(e)].

Various adjuvants may be incorporated at various times in the polymers of the invention. These adjuvants, which are typical and are well known to this art, may be, for example, stabilizers or degradation inhibitors, lubricants or demolding agents, colorants or pigments, or pulverulent or particulate fillers such as silicates, carbonates, kaolin, chalk, powdered quartz, mica or ballotini. It is also possible to incorporate adjuvants which modify the physical structure of the product obtained such as, for example, blowing agents or fibrous reinforcing agents such as, especially, carbon, polyimide or aromatic polyamide fibrils or whiskers.

The polymers according to the invention may be prepared by direct heating of the bisimide(s) (a), of the amine reactant (b) and of the additives (e) and (f), optionally in the presence of the reactant (c) and/or of the imidazole compound (d), at least until a homogeneous liquid mixture is produced. The temperature may vary as a function of the physical state of the compounds present, but generally it ranges from 50° C. to 300° C. It is advantageous to bring and to maintain the starting compounds to an intimately admixed state before and during the heating, for example with the aid of good stirring. When the reactant (c) and/or the imidazole compound (d) is (are) employed, it is (they are) preferably added to the well-stirred reaction mixture after the mixture of (a)+(b)+(e)+(f) has been melted. When the compound (d) is particularly active, and in order to prevent its encapsulation in the polymer structure generated, it is desirable to add it in a solvent or diluent which is compatible with the reaction mixture; it was found that it could be advantageous to employ one of the polar organic liquids which are referred to below as a solvent or diluent.

The preparation of the polymers according to the invention can also be carried out by heating the mixture of the reactants in the presence of variable amounts of an organic diluent which is liquid over at least a part of the range 50° C.-250° C. Among such diluents, particularly representative are the aromatic hydrocarbons such as xylenes and toluene, halogenated hydrocarbons such as chlorobenzenes, polar organic liquids such as dioxane, tetrahydrofuran, dibutyl ether, dimethylformamide, dimethyl sulfoxide, N-methylpyrrolidone, dimethylacetamide, cyclohexanone, methyl glycol and methyl ethyl ketone. The polymer solutions or suspensions may be employed as such for many applications; the polymers may also be isolated, for example by filtration, optionally after precipitation by means of an organic diluent which is miscible with the solvent employed.

It should be appreciated that the properties of the polymers according to the invention may vary to a great extent, especially as a function of the precise nature of the reactants employed, of the proportions of reactants which are selected and of the precise temperature conditions which are adopted within the above-mentioned range. With regard to the polymers obtained, these may be cured polymers, insoluble in the usual solvents such as, for example, the polar organic liquids mentioned in the preceding paragraph, and exhibiting no appreciable softening below the temperature at which they begin to degrade.

However, these polymers can also exist in the form of prepolymers (P), soluble in polar organic solvents such as, for example, those referred to above and exhibit a softening point at a temperature below 200° C. (in general this softening point ranges from 50° C. to 150° C.). These prepolymers may be prepared in bulk by heating the mixture of the reactants until a homogeneous or pasty product is obtained, at a temperature which generally ranges from 50° to 180° C. for a period of time which may range from a few minutes to a few hours, this period being proportionately shorter the higher the temperature adopted. Before the mixture of the reactants is subjected to heating, it is advantageous, here too, to mix it thoroughly by stirring beforehand. Here again there is a preferred method of using the reactant (c) and/or the optional imidazole compound (d), and it is that indicated above in connection with the direct preparation of cured polymers. The preparation of the prepolymers can also be carried out in the presence of variable amounts of a diluent which is liquid over at least a part of the range 50°-180° C. In this context, the polar organic liquids referred to above can be advantageously used as a diluent.

The prepolymers (P) may be employed in the bulk liquid state, simple hot casting being sufficient for shaping and the production of molded articles. It is also possible, after cooling and milling, to employ them in the form of powders which are remarkably well suited for compression molding operations, optionally in the presence of fillers in the form of powders, spheres, granules, fibers of flakes. In the form of suspensions or of solutions, the prepolymers (P) may be employed for the production of coatings and of preimpregnated intermediate articles (prepregs) whose reinforcement may comprise fibrous substances based on aluminum or zirconium silicate of oxide, carbon, graphite, boron, asbestos or glass. These prepolymers (P) may also be employed for the production of cellular materials after incorporation of a blowing agent such as, for example, azodicarbonamide.

In a second stage, the prepolymers (P) may be cured by heating them to temperatures on the order to 300° C., generally ranging from 150° to 300° C.; an additional shaping may be carried out during the curing, optionally under vacuum or under superatmospheric pressure, it also being possible for these operations to be consecutive.

In a preferred embodiment of the present invention, the operation is carried out in two stages, the first stage entailing heating the mixture of the reactants to from 50° to 180° C. to form a prepolymer (P), the second stage entailing curing the prepolymer (P) after it has been shaped as desired, by heating to temperatures on the order of 300° C., generally ranging from 150° C. to 300° C.

In another preferred embodiment of the present invention, the operation is carried out in two stages, but employing in the first stage a continuous process for the preparation of the prepolymer (P), entailing separately introducing into a kneader containing an extruder screw:

(i) on the one hand, the bisimide (a) in the divided solid state; and (ii) on the other hand, the several reactants comprising the amine reactant (b) and the additive (e) in the solid, liquid or molten state, and the additive (f) in the liquid state with, if need be, the reactant (c) in the liquid state and/or the imidazole compound (d) in the solid state or in solution, it being possible for the various reactants of this group themselves to be introduced, for their part, together or separately, optionally in the presence of a diluent which is liquid over at least a part of the range 50°-180° C.

By the expression "kneader containing an extruder screw" is intended an apparatus which does not have any dead region when the substance is advanced forward. Apparatus of this type which may comprise one or more screws is described in the text by E.G. Fisher, *Extrusion of Plastics* (Interscience Publishers 1964), pages 104 to 108. These kneaders may contain two endless screws meshing intimately with each other and rotating in the same direction; an apparatus of this type, equipped more particularly for the preparation of alkali metal terephthalates, is described in French Patent FR-A-1,462,935. Another variety of kneaders which can be employed is apparatus containing an endless screw with interrupted flights performing a rotary movement and an oscillating movement in the direction of the axis simultaneously, which is housed in an enclosure comprising teeth which interact with the interrupted flights of the screw. Apparatus of this type is described in French Patents FR-A-1,184,392, 1,184,393, 1,307,106 and 1,369,283.

The polymers according to the invention are of interest to industrial sectors which require materials having good mechanical and electrical properties, as well as great chemical inertness at temperatures of 200° to 300° C. For example, they are suitable for the manufacture of plate or tubular insulators for electrical transformers, supports for printed circuits, and the like. The preimpregnated articles can be employed for the production of components having various shapes and functions in many fields of application such as, for example, in the electrical and electronics industries. These components, deemed laminates, which may be articles of revolution, are obtained by arraying a number of layers of prepregs onto a form or a support. The prepregs can also be employed as reinforcements or as means for repairing damaged components.

In order to further illustrate the present invention and the advantages thereof, the following specific example is given, it being understood that same is intended only as illustrative and in nowise limitative.

EXAMPLE

The following constituents were introduced at ambient temperature into a glass reactor fitted with an anchor-type stirrer;

(i) 77.5 g (0.216 moles) of N,N'-4,4'-diphenylmethanebismaleimide;

(ii) 14.5 g (0.047 moles) of 4,4'-diamino-3,3',5,5'-tetraethyldiphenylmethane;

(iii) 8 g (0.043 moles) of 2,4-diamino-6-phenyl-1,3,5-triazine (or benzoguanamine); and (iv) 10 g of a brominated epoxy resin resulting from the condensation of tetrabrominated bisphenol A with epichlorohydrin; it had an elemental bromine content on the order to 50% by weight and an epoxy equivalent weight of 450; it is available commercially under the registered trademark Qatrex of the Dow company, type 6410. The amount of bromine introduced by the epoxy resin, expressed by the percentage by weight of elemental bromine in relation to the weight of the combination of bisamide+diamine+copolymerizable monomer (N- vinylpyrrolidone: cf. below)+guanamine+epoxy resin, was equal to 4.2%. This resin was introduced into the reactor in the form of a solution in 10 g of cyclohexanone.

The reactor was immersed in an oil bath preheated to 160° C. and the mixture was stirred until the ingredients introduced melted completely and a homogeneous mass was obtained. The length of time of this stage was 5 minutes. The molten mixture thus obtained was cooled to 140° C. and 10 g of N-2-vinylpyrrolidone were introduced, and the entire mass was then permitted to react under stirring for 28 minutes.

A prepolymer which had a softening point close to 80° C. was thus obtained. The "softening point" was the approximate temperature at which a glass rod 6 mm in diameter could easily penetrate a few millimeters into the prepolymer. This prepolymer was soluble in solvents such as, for example, N-methylpyrrolidone, dimethylformamide and cyclohexanone.

Prepregs and 10-ply laminates (10 layers of prepregs) were manufactured from a first batch of prepolymer prepared as indicated above. To this end, a solution of prepolymer at a concentration of 50% by weight in N-methylpyrrolidone was employed to coat a glass fabric manufactured by the Porcher company under reference 7628, whose weight per unit area was 200 g/m² and which had been subjected to a treatment with gamma-aminopropyltriethoxysilane (Union Carbide silane A 1100). The impregnated fabric contained 40 g of prepolymer per 60 g of fabric; it was dried for 5 minutes in a ventilated atmosphere at 160° C. 10 squares (15 ×15 cm) were then cut therefrom and these were stacked with a copper sheet 35 μm in thickness, placed on one of the outer face surfaces of the stack, and the assembly was placed between the platens of a press under the following conditions:

| (a) pressure | 40 × 10⁵ Pa. |
|---|---|
| (b) heating of the press platens | 2 hours at 190° C. |

No postcure was carried out and the adhesion of the copper to the 10-ply laminate was examined directly; this adhesion, measured with a tensometer by pulling the copper at an angle of 90° (according to MIL Standard P 55 617 B using a pulling speed of 55 mm/min was on the order of 19.0 N/cm. Under the same conditions, the 10-ply copper laminate manufactured from a prepolymer prepared as indicated above but in the absence of benzoguanamine resulted in an adhesion on the order of 16.0 N/cm; this value could be increased to about 19 N/cm, but on condition of subjecting the 10-ply laminate to a postcure at 200° C. for 16 hours.

Prepregs containing 45% by weight of prepolymer and laminates comprising 5 plies were prepared from a second batch of prepolymer under the conditions described above (it should be noted that no copper sheet was employed here) without performing a postcure. Combustibility measurements were carried out according to the UL 94 vertical test (thickness of the test specimens based on laminate: 0.8 mm; the proportion of resin in the laminate was approximately 40% by weight; the combustion time is given in seconds after conditioning for 48 hours at 23° C. and 50% relative humidity. The classification was established from an average of 10 results: 5 test specimens and 2 tests on each specimen):

| (a) combustion time | 3 s; |
|---|---|
| (b) classification | VO. |

Prepregs containing 40% by weight of prepolymer and laminates comprising 22 plies were prepared from a third batch of prepolymer under the conditions described above (no copper sheet was employed here either) without performing a postcure in this case either. Measurements of thermal expansion coefficient along the Z axis of the laminates were carried out (thickness of the laminate-based specimens: 3 mm). These measurements were carried out by thermomechanical analysis (TMA), using a Du Pont model 982 instrument, with a rate of temperature increase of 10 K/min under nitrogen atmosphere. The value determined for this coefficient was on the order of $42 \times 10^{-6}$ m m$^{-1}$ K$^{-1}$. Under the same conditions, the 22-ply laminate manufactured from a prepolymer prepared in the absence of benzoguanamine exhibited a thermal expansion coefficient along the Z axis on the order of $60 \times 10^{-6}$ m m$^{-1}$ K$^{-1}$; this value could be reduced to about $40 \times 10^{-6}$ m m$^{-1}$ K$^{-1}$ but on condition of subjecting the 22-ply control laminate to a postcure at 200° C. or 16 hours.

Furthermore, the glass transition temperature of the cured polymer which was evaluated during the measurements performed by thermomechanical analysis, was determined to be equal to 200° C. whereas it was 150° C. in the absence of benzoguanamine.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An imido polymer comprising the copolymerizate of:

(a) at least one N,N'-bisimide of the formula:

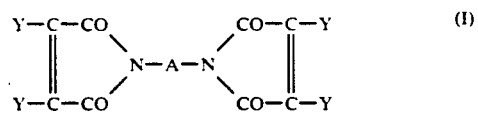

in which each of the symbols Y, which may be identical or different, is H, CH$_3$ or Cl; and the symbol A is a cyclohexylene, phenylene, 4-methyl-1,3-phenylene, 2-methyl-1,3-phenylene, 5-methyl-1,3-phenylene or 2,5-diethyl-3-methyl-1,4-phenylene radical, or a radical of the formula:

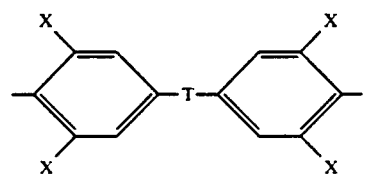

in which T is a single valence bond or one of the groups:

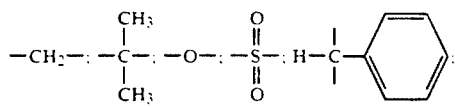

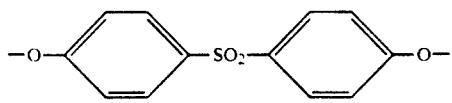

and each of the symbols X, which may be identical or different, is a hydrogen atom or a methyl, ethyl or isopropyl radical;

(b) at least one hindered diprimary diamine;

(c) optionally, at least one unhalogenated comonomer other than a bisimide of formula (I) and comprising one or more polymerizable carbon-carbon double bonds; and (d) optionally, an imidazole compound;

with the proviso that said at least one hindered diprimary diamine (b) comprises (i) a compound having the general formula:

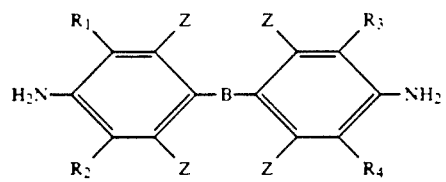

in which each of the symbols $R_1$, $R_2$, $R_3$ and $R_4$, which may be identical or different, is a methyl, ethyl, propyl or isopropyl radical; each of the symbols Z, which may be identical or different, is a hydrogen atom or a chlorine atom; and the symbol B is one of the radicals: —CH$_2$—;

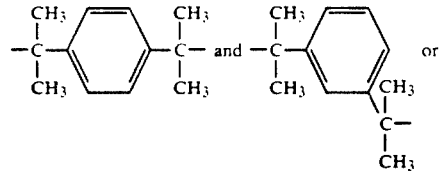

(ii) a compound having the general formula:

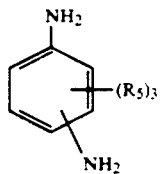

in which the amino radicals are in a meta or para position relative to each other; and each of the symbols $R_5$, which may be identical or different, is a methyl, ethyl, propyl or isopropyl radical;

and with the further proviso that said copolymerizate additionally comprises:

(e) at least one substituted guanamine of the formula:

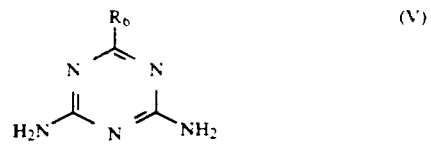

in which the symbol $R_6$ is a linear or branched chain alkyl radical having from 1 to 12 carbon atoms, an alkoxy radical having rom 1 to 12 carbon atoms, a phenyl radical optionally substituted by 1 to 3 alkyl radicals having from 1 to 3 carbon atoms, a phenylalkyl radical having from 1 to 3 carbon atoms in the alkyl moiety and the benzene nucleus of which may optionally be substituted by 1 to 3 alkyl radicals having from 1 to 3 carbon atoms; and (f) at least one compound selected from among:

(f1) a chlorinated or brominated epoxy resin;

(f2) an N,N'-alkylenebistetrahalophthalimide of the formula:

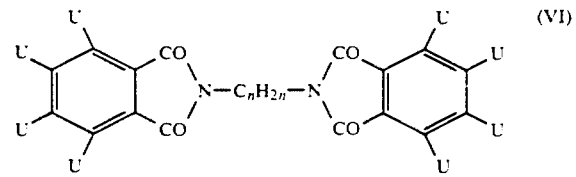

in which each of the symbols U, which may be identical or different, is a chlorine or bromine atom; the alkylene radical —$C_nH_{2n}$— may be linear or branched; and n is an integer equal to 1, 2, 3 or 4;

(f3) a halogenated compound of the formula:

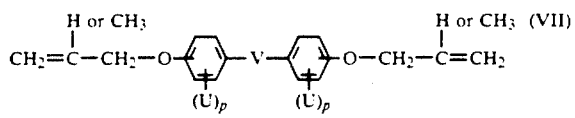

in which the symbols U are as defined above; the symbol V is a single valence bond, a linear or branched alkylene radical —$C_nH_{2n}$—, with n being equal to 1, 2, 3 or 4, or an oxygen atom; and p is an integer equal to 2, 3 or 4;

(f4) an unhalogenated epoxy resin; and (f5) a mixture of at least two of the above compounds (f1) to (f4).

2. The imido polymer as defined by claim 1, said at least one N,N'-bisimide (a) comprising N,N'-meta-phenylenebismaleimide; N,N'-para-phenylenebismaleimide; N,N'-4,4'-diphenylmethanebismaleimide; N,N'-4,4'-diphenyl ether bismaleimide; N,N'-4,4'-diphenyl sulfone bismaleimide; N,N'-1,4-cyclohexylenebismaleimide; N,N'-4,4'-(1,1-diphenylcyclohexane)bismaleimide; N,N'-4,4'-(2,2-diphenylpropane)bismaleimide; N,N'-4,4'-triphenylmethanebismaleimide; N,N'-2-methyl-1,3-phenylenebismaleimide; N,N'-4-methyl-1,3-phenylenebismaleimide; N,N'-5-methyl-1,3-phenylenebismaleimide; or mixture thereof.

3. The imido polymer as defined by claim 1, said at least one hindered diprimary diamine (b) comprising 4,4'-diamino-3,3',5,5'-tetramethyldiphenylmethane; 4,4'-diamino-3,3',5,5'-tetraethyldiphenylmethane; 4,4'-diamino-3,5-dimethyl-3',5'-diethyldiphenylmethane; 4,4'-diamino-3,3'-diethyl-5,5'-dimethyldiphenylmethane; 4,4'-diamino-3,3',5,5'-tetraisopropyldiphenylmethane; 4,4'-diamino-3,3'-diisopropyl-5,5'-dimethyldiphenylmethane; 1,4-bis(4-amino-3,5-dimethyl-α,α-dimethylbenzyl)benzene; 1,3-bis(4-amino-3,5-dimethyl-α,α-dimethylbenzyl)benzene; 1,3-diamino-2,4-diethyl-6-methyl-benzene; 1,3-diamino-2-methyl-4,6-diethylbenzene; or mixture thereof.

4. The imido polymer as defined by claim 1, said at least one substituted guanamine (e) comprising 2,4-diamino-6-methyl-1,3,5-triazine; 2,4-diamino-6-ethyl-1,3,5-triazine; 2,4-diamino-6-butyl-1,3,5-triazine; 2,4-diamino-6-nonyl-1,3,5-triazine; 2,4-diamino-6-undecyl-1,3,5-triazine; 2,4-diamino-6-methoxy-1,3,5-triazine; 2,4-diamino-6-butoxy-1,3,5-triazine; 2,4-diamino-6-phenyl-1,3,5-triazine; 2,4-diamino-6-benzyl-1,3,5-triazine; 2,4-diamino-6-(4-methyl)phenyl-1,3,5-triazine; or mixture thereof.

5. The imido polymer as defined by claim 1, said at least one compound (f) comprising:
(f1): a chlorinated or brominated epoxy resin having an epoxy equivalent weight of from 200 to 2,000 and which comprises the glycidyl ether prepared by reacting epichlorohydrin with an aromatically halogenated polyphenol;
(f2): an N,N'-alkylenebistetrabromophthalimide;
(f3): a bis(allyloxydibromophenyl)alkane of the formula:

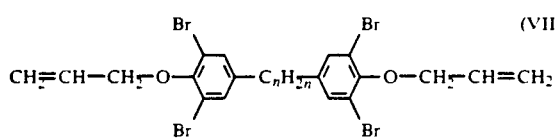

(VIII)

in which n is an integer equal to 1, 2 or 3;
(f4): an unhalogenated epoxy resin having an epoxy equivalent weight of from 100 to 1,000 and which comprises the glycidyl ether prepared by reacting epichlorohydrin with a polyphenol; or (f5): a mixture of at least two of the above compounds (f1) to (f4).

6. The imido polymer as defined by claim 1, wherein the amounts of said at least one N,N'-bisimide (a) and said at least one hindered diamine (b) are such that the ratio r:

$$r = \frac{\text{number of moles of bisimide(s) (a)}}{\text{number of moles of diamine(s) (b)}}$$

ranges from 1.5/1 to 20/1.

7. The imido polymer as defined by claim 1, comprising said at least one unhalogenated comonomer (c), in an amount constituting less than 60% of the total weight of the monomers (a)+(b).

8. The imido polymer as defined by claim 1, comprising said imidazole compound (d), in an amount ranging from 0.005 to 1% by weight of the total weight of the monomers (a)+(b)+optionally (c).

9. The imido polymer as defined by claim 1, wherein the amount of said at least one guanamine (e) constitutes from 2% to 30% by weight of the total weight of the monomers (a)+(b)+(f)+optionally (c).

10. The imido polymer as defined by claim 1, wherein the amount of said at least one compound (f) constitutes from 2% to 30% by weight of the total weight of the monomers (a)+(b)+optionally (c), and further wherein the amount of chlorine or bromine introduced by the compound (f), expressed as the percentage by weight of elemental chlorine or of elemental bromine relative to the total weight of the monomers (a)+(b)+optionally (c)+(e)+(f), constitutes not more than 8%.

11. The imido polymer as defined by claim 1, in cured state, insoluble in typical polar organic solvents and exhibiting no appreciable softening below the degradation temperature thereof.

12. The imido polymer as defined by claim 1, in heat-curable prepolymeric state, soluble in typical polar organic solvents and exhibiting a softening point at a temperature below 200° C.

13. A shaped article comprising the imido polymer as defined by claim 11.

14. A shaped article comprising the imido polymer as defined by claim 12.

* * * * *